United States Patent [19]

Minssen et al.

[11] 4,018,864

[45] Apr. 19, 1977

[54] METHOD FOR MAKING FUSED REFRACTORY PRODUCTS

[75] Inventors: Bernard Minssen, Avignon; Georges Parigot, Le Pontet, both of France

[73] Assignee: L'Electro-Refractaire, France

[22] Filed: Oct. 25, 1972

[21] Appl. No.: 300,493

Related U.S. Application Data

[62] Division of Ser. No. 83,706, Oct. 26, 1970, abandoned.

[30] Foreign Application Priority Data

Oct. 27, 1969 France ............................ 69.36769

[52] U.S. Cl. ................................ 264/299; 264/337

[51] Int. Cl.[2] ....................... B28B 1/14; B29C 5/00

[58] Field of Search .............. 264/39, 60, 219, 337, 264/255, 256, 332; 249/174, 206; 164/348; 65/66, 319, 374; 425/812

[56] References Cited

UNITED STATES PATENTS

| | | | |
|---|---|---|---|
| 1,207,867 | 12/1916 | Cordes | 65/374 |
| 1,546,266 | 7/1925 | Thompson et al. | 264/332 |
| 1,897,003 | 2/1933 | Goldsborough et al. | 264/60 |
| 1,936,280 | 11/1933 | Williams | 249/174 |
| 2,221,947 | 11/1940 | Kauffman | 249/174 |
| 3,163,687 | 12/1964 | Einhorn | 425/812 |
| 3,258,840 | 7/1966 | Hedgewick et al. | 264/219 |
| 3,584,088 | 6/1971 | Williams | 264/39 |
| 3,606,637 | 9/1971 | Lawless | 264/332 |

OTHER PUBLICATIONS

Anon., Webster's Seventh New Collegiate Dictionary, Merriam, Springfield, Mass. (1967), pp. 696 & 720 relied on.

Jones, G. O., Glass, Methuen, N.Y. (1956), pp. 6, 7, 22 & 23 relied on.

*Primary Examiner*—Willard E. Hoag
*Attorney, Agent, or Firm*—Watson, Cole, Grindle & Watson

[57] ABSTRACT

A mold for molding melted refractory products, which comprises, on the internal surface of its side walls, thin surface discontinuities for holding the solidified crusts which are formed against said side walls, above the level of the melted product, on filling the mold, due to the splashing of some of the melted product. Preferably the side walls of the mold are metallic and cooled by a circulating liquid. The mold of the invention permits to make molded products which are free from the defects called "casting side voids".

5 Claims, 6 Drawing Figures

Inventors
Bernard Minssen
Georges Parigot
by
Watson, Cole, Grindle & Watson

METHOD FOR MAKING FUSED REFRACTORY PRODUCTS

This is a division of co-pending application Ser. No. 83,706, filed Oct. 26, 1970 and now abandoned.

This invention relates to the production of refractory parts which may be used, for example, to make linings for equipment intended to be resistant to high temperatures and corrosive environments, particularly, in the metal and glass industries.

These refractory parts are generally made by pouring into a mold a refractory oxide or mixture of such oxides such as magnesia, zirconia, alumina, chromium oxide, etc. previously fused at high temperature, most often in an electric oven.

It sometimes happens that the stream of fused liquid dropping into the mold, splashes onto the walls of the mold and solidifies thereon very rapidly thus forming thin crusts. These crusts may partially come off the wall of the mold and interfere with the molding when the level of the liquid in the mold reaches their level. Surface irregularities and uneven zones which may be substantial and are known as "casting side voids" can be seen on the parts.

This fault is all the more to be apprehended as the refractory oxide melting temperature is higher with consequent solidification being therefore more rapid upon contact with the walls of the mold. It is particularly pronounced when the walls of the mold are good heat conductors and especially when these walls are made of metal cooled with circulating water.

Applicant has found that this drawback can be eliminated by providing the internal surface of the mold with grooves or fine cavities or more generally fine surface discontinuities of suitable dimensions and spacing. It is noted that in the presence of these discontinuities, the solidified crusts resulting from splashes remain attached to the wall and no longer have a disturbing influence on the uniformity of the mold; the part bears the imprint of these discontinuities but the latter may be sufficiently fine so as not to be objectionable.

The following description in reference to the appended drawing, given as a non limiting example, will lead to a good understanding as to how the invention can be practiced, the particular embodiments relative to the drawing and description being, of course, part of said invention.

FIG. 1 shows at 1, a mold into which a mixture of refractory oxides, fused at high temperature, is being poured through a funnel 2, from an electric oven. The pouring spout of the oven is located at 3, above funnel 2.

Figure 1:
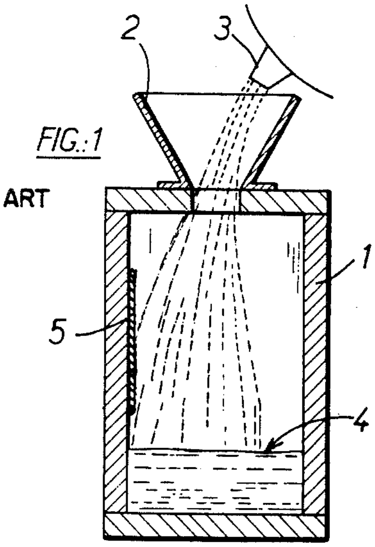
FIG.:1 PRIOR ART
FIGS. 1, 2, 3 and 4 are diagrammatic views showing the formation of a casting side void.
Figure 2:
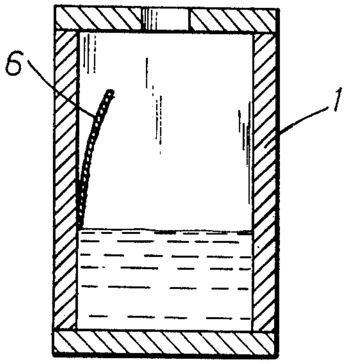
FIG.:2 PRIOR ART
Figure 3:
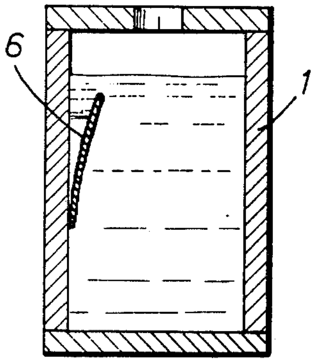
FIG.:3 PRIOR ART
Figure 4:
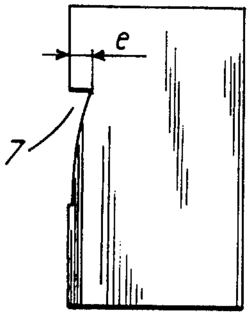
FIG.:4 PRIOR ART

Level 4 of the liquid rises progressively in the mold, but before the latter is filled, splashes of fused liquid may impinge against the free internal wall of the mold. These splashes solidify very rapidly, upon contact with the mold, forming thereon thin solidified crusts such as those shown at 5 in FIG. 1. Immediately upon solidification, such a crust has a tendency to come off the mold through its upper part, as shown at 6 in FIG. 2. This crust, which is rather hard then keeps away liquid from the wall of the mold, as seen in FIG. 3. The liquid does not completely fill the space between the crust and the mold and, finally, the ingot, after stripping, has the appearance shown in FIG. 4. There is a recess at 7 termed "casting side void" which may be rather substantial, since in certain cases dimension e may be as much as 10 mm. A single part can of course bear several faults of this type distributed in a random fashion.

Figure 5:
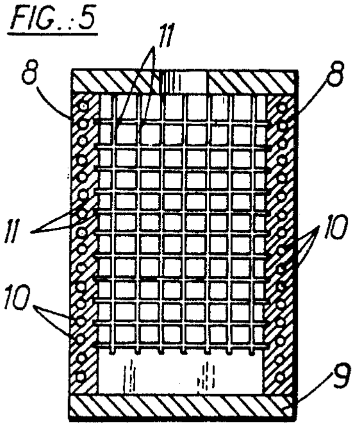
FIG. 5 is a cross-sectional view of an improved mold according to the invention.

One embodiment of an improved mold according to the invention is shown in FIG. 5. It comprises vertical walls 8 made of metal, preferably, electrolytic copper, and a bottom 9 comprising a graphite plate. The metal walls 8 are provided, within their inside, with channels 10, through which a cooling liquid, such as water, can be circulated by means of a pump during the casting operation, so as to avoid the destruction of the metal walls by the high temperature of the castmass which temperature may be as high as, and even higher than, 2500° C.

Such metal molds have been found to be very suitable because they have a longer life than molds made entirely of graphite. The walls of the mold can easily be designed so as to open thus providing, among other advantages for easy and rapid stripping of the ingot, and therefore, rapid re-use of the mold. But with such molds the casting side void drawback is particularly pronounced for splashes from the cast mass solidify very rapidly.

In the embodiment of the invention, shown in FIG. 5, the walls of the mold above the bottom comprise grooves 11 on their internal surface.

It has been noted that, when the width of these grooves is suitably chosen, depending on the nature of the cast mass, the casting side voids no longer appear on the parts. The solidified crusts are maintained against the wall of the mold and are prevented from coming loose, as mentioned in reference to FIG. 2.

For example, in the case of a fused charge comprising magnesia, chromium oxide, iron oxide and alumina (product known commercially as "Corhart 104") cast into a mold of the type shown in FIG. 5 with water cooled copper walls, it was found that a suitable width of the grooves was of the order of 0.5 to 1 mm. The imprint of these grooves is seen on the part, but without any excessive projections, since the width of the grooves is small and, furthermore, the continuity of the surface of the part is, in any case, quite superior to that noted in the presence of casting side voids.

The spacing of the grooves must be sufficiently narrow so that solidified crusts of dangerous dimensions will be reliably held. It was found that this spacing can be as much as 80 mm. The lower limit is set by mechanical construction difficulties. The lower limit is approximately 5 mm. The preferred value is of the order of 20 mm.

Figure 6:
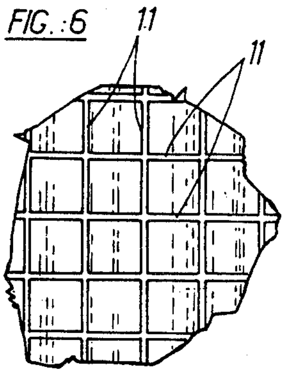
FIG. 6 is a partial view, to a larger scale, of the internal face of one wall of the mold.

The grooves can be arranged in parallel lines, for example, vertical or horizontal. They should be set up, preferably, as crossed lines, thus providing a kind of chequer-work pattern, as shown in FIGS. 5 and 6.

The depth of the grooves can vary rather widely. Thus, in the example under consideration, depths of the order of 2 to 6 mm have proved to be satisfactory.

Instead of being continuous, the grooves might be discontinuous and thus comprise slit-shaped notches.

Small cavities of polygonal or circular profile, at a suitable distance from one another, might also be provided into the wall of the mold, but grooves are of course easier to make.

Conversely, the discontinuities in the surface of the mold might be small projections.

It should be noted that grooves are also superior in that they resist thermal deformation of the walls of the mold which may be induced by the action of the liquid at very high temperature.

We claim:

1. In a process for casting molten oxide-based refractory materials in a mold, the step of preventing the formation of casting side voids during said casting by holding solidified crusts formed on the inner surfaces of the side walls of the mold against said inner surfaces through the use of a mold having a plurality of discontinuities provided on the inner surfaces of its walls, said discontinuities each having a width of about 0.5 to 1.0 millimeters and being laterally spaced about 5 to 80 millimeters from discontinuities extending in the same general direction.

2. A process as set forth in claim 1 wherein said discontinuities comprise projections.

3. A process as set forth in claim 1 wherein said side walls are cooled internally during said molding.

4. A process as set forth in claim 1 wherein said discontinuities comprise grooves.

5. A process as set forth in claim 4 wherein a number of said grooves are arranged in crossing relationship relative to another group thereof.

* * * * *